United States Patent [19]

La Haye et al.

[11] 4,070,841

[45] Jan. 31, 1978

[54] INSULATED WALL MEANS AND METHOD

[75] Inventors: Paul G. La Haye; Ralph E. Anderson, both of Cape Elizabeth, Maine

[73] Assignee: Hague International, S. Portland, Maine

[21] Appl. No.: 683,062

[22] Filed: May 4, 1976

[51] Int. Cl.² .......................... F27D 1/16; E04B 1/62
[52] U.S. Cl. ................................. 52/506; 110/1 A; 52/573
[58] Field of Search ............... 52/410, 573, 363, 483, 52/358, 712, 713, 714, 680, 269, 506, 508; 110/1 A; 138/147, 149; 432/247, 248, 249

[56] References Cited

U.S. PATENT DOCUMENTS

| 2,412,744 | 12/1946 | Nelsson | 52/410 |
| 2,661,515 | 12/1953 | Nelsson | 52/714 |
| 2,714,305 | 8/1955 | Nelsson | 52/358 |
| 3,299,597 | 1/1967 | Davey | 52/410 |
| 3,377,760 | 4/1968 | Waite | 52/410 |

Primary Examiner—John E. Murtagh
Attorney, Agent, or Firm—Wolf, Greenfield & Sacks

[57] ABSTRACT

An insulated material comprises a first wall having a surface with a layer of insulation thereover. The insulation is anchored to the wall by a plurality of rods which are each attached to the wall and extends through the insulation. The rods are interlocked at expansion point means which allows expansion and contraction of the rods without permitting movement of the insulation from its position.

6 Claims, 4 Drawing Figures

U.S. Patent  Jan. 31, 1978  4,070,841
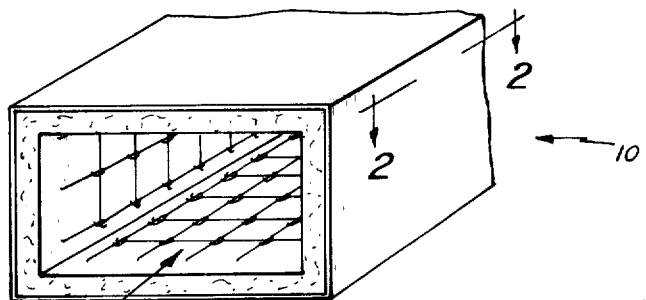
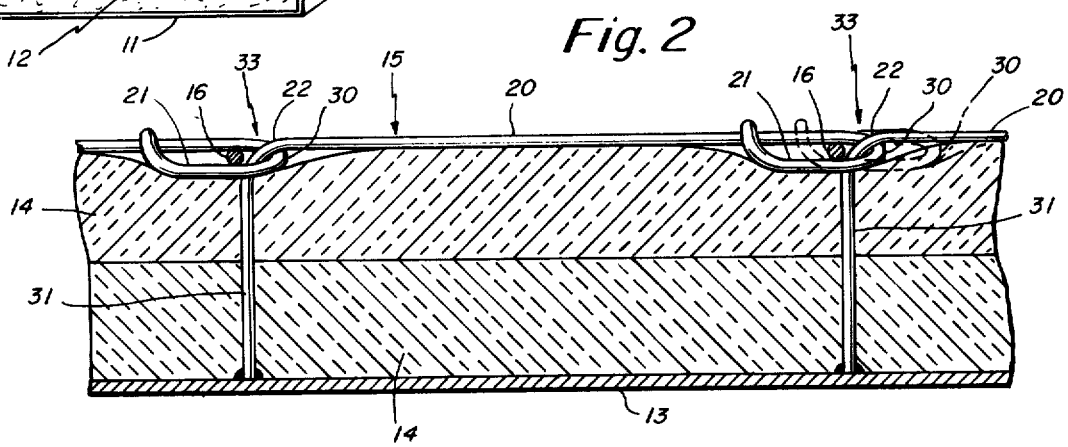
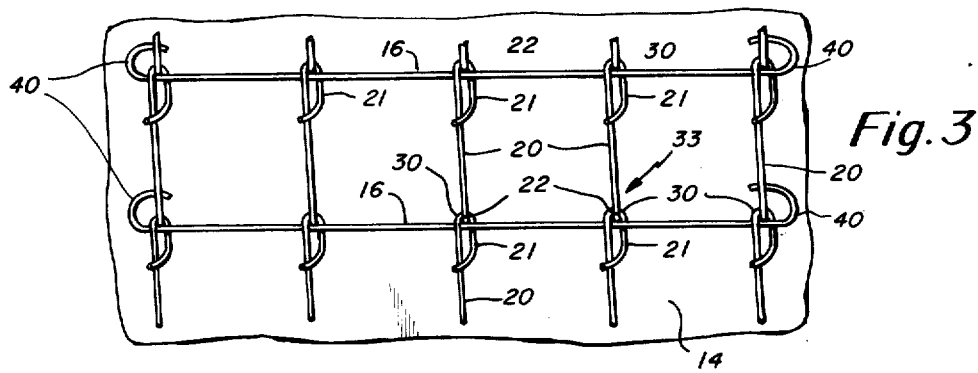
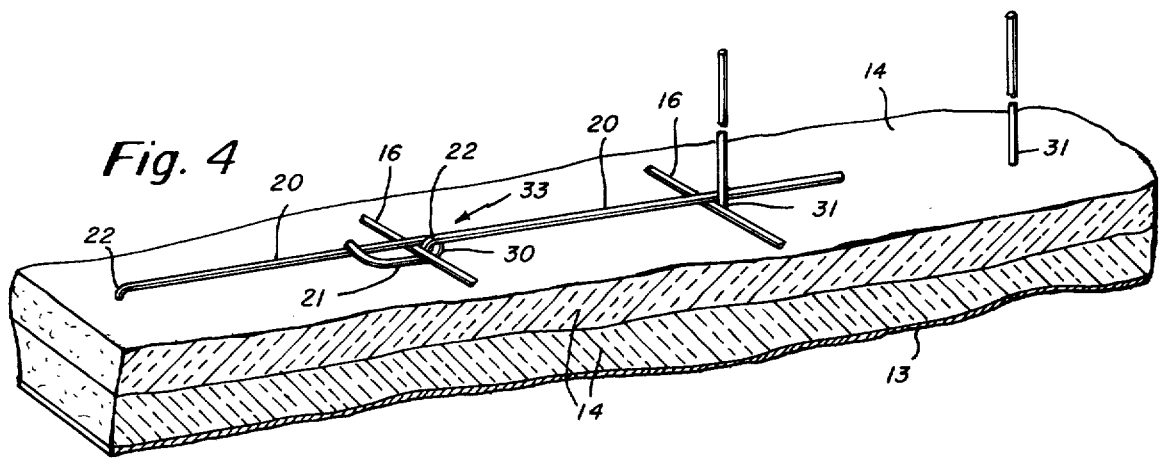

INSULATED WALL MEANS AND METHOD

BACKGROUND OF THE INVENTION

There are many applications in the thermal energy area where it is desired to contain high temperature fluids in a vessel or conduit with a minimum loss of thermal energy. Thermal insulation is usually applied to either the inner or outer wall of the containment vessel or conduit. Such walls are conventionally made of metal in high temperature applications with steel being preferred because of its relatively low cost. There are problems in attaching thermal insulation to metal walls where temperatures in the range of 300° F to 2700° F can be encountered.

In conventional procedures metal studs are welded to walls with conventional welders and used as anchors to restrain or hold the insulation in place. Such studs can have button tops, hook tops and the like as well-known in the high temperature insulation field. Such studs are often used for acoustic insulation in attachment to metal walls in addition to use with thermal insulation.

Because thermal insulation having thermal conductivities in the range of from 0.01 BTU/hr/ft$^2$/° F/ft to 0.2 BTU/hr/ft$^2$/° F/ft is normally structurally weak, it is important to provide good support particularly in areas where high velocity fluids pass over the insulation or where mechanical vibration occurs in normal usage. If good support is not provided the thermal insulation tends to break down and fall off the metal wall. Often the insulation is placed on the hot side of the wall or conduit and meshes such as stainless steel meshes are placed over the insulation to improve the support of the insulation against the wall and in an attempt to maintain the insulation in a planar layer against the wall. The mesh is often stainless steel such as series 300 stainless steel or for extreme temperatures alloy materials such as Iconel. Often the cost of the stainless steel or alloy metals exceed the cost of the thermal insulation itself. Moreover, meshes tend to expand from their plane when heated which can lead to bulging of the insulation and separation from the metal wall to be insulated with attendant reduction in size of conduits and possible damage to the insulation.

SUMMARY OF THE INVENTION

It is an important object of this invention to provide an insulated material where the insulation is bound to a wall by a stitching which maintains the insulation in place even under extreme variations in temperature conditions.

It is another object of this invention to provide a joint means in accordance with the preceding object which is relatively inexpensive to construct, highly durable, resistant to high temperature, and maintains the position of the insulation over long time periods of use and frequent temperature cycling.

Still another object of this invention is to provide a method of forming the joint means which is inexpensive to carry out and can be easily carried out by relatively untrained craftsmen in short time periods with good repeatability of desired result.

According to the invention, an insulated material comprises a first wall having a surface with a layer of insulation thereover. The insulation is anchored to the wall by a plurality of rods each attached to the wall and extending through the insulation. The rods are interlocked with each other by joint means for maintaining the insulation in place while allowing expansion and contraction of the rods along their axis when subjected to temperature variations which expand and contract the rods.

Preferably the insulation is thermal insulation having a thermal conductivity in the range of from 0.01 BTU/hr/ft$^2$/° F/ft to 0.2 BTU/hr/ft$^2$/° F/ft and the insulated material is resistant to destruction of the insulation or substantial bulging of the insulation even when exposed to temperatures in the range of 300° F to 2700° F.

It is a feature of this invention that it can be used to thermally insulate conduits, vessels or walls of all kinds from hot fluids which may be gases or liquids.

The joint means is preferably a looped interlock of an end of one rod with an intermediate portion of a second rod whereby the first rod when expanded axially, continues to grip the first rod and substantially maintains its axial position while extending along its length.

According to the method of this invention, a non-self-supporting insulating material is stitched to a surface to be insulated by attaching studs to the surface, passing said studs through an insulation layer placed adjacent the surface, bending over the studs intermediate their ends, with an outer end of each stud looping about the bent over portion of an adjacent stud so as to place an extended portion of that stud adjacent to and holding an extended line portion on the surface of said insulation. The bent over looped portion permits axial expansion while still maintaining each stud substantially in contact with the insulation and without substantial movement from its original axial position. Preferably rows of studs are formed with looped joints and additional locking wires are passed through the loops to form a grid support for the insulation.

BRIEF DESCRIPTION OF THE DRAWINGS

The above and other features, objects and advantages of the present invention will be better understood from a reading of the following specification in conjunction with a viewing of the drawings in which:

FIG. 1 is a partial perspective view of a conduit insulated in accordance with the present invention;

FIG. 2 is a cross section through line 2—2 thereof;

FIG. 3 is a top plan view of the inside of a wall thereof;

FIG. 4 is illustrative of a step in the method of fabricating the conduit of FIG. 1.

BRIEF DESCRIPTION OF THE PREFERRED EMBODIMENTS

With reference now to the drawings, a conduit 10 is shown in FIG. 1 which is made up of an encircling wall 11 having an inner elongated passageway 12 for the passage of hot gases. The conduit wall 11 comprises a steel wall plate 13 with an overlying inner thermal insulation layer 14 stitched to the wall by a plurality of rods 15 and interlocking wires 16.

The steel plate is designed to remain cool even when the inside passage carries hot gases or liquids in the range of 300° F to 2700° F.

The wall to be insulated can be an encircling wall, a vessel wall or a wall of any size or shape exposed to high temperatures or sound. The insulation can be inside or outside conduit or vessel walls. Metal and preferably steel plates are used in order to give rigid support and withstand whatever high temperatures may be involved. However, the stitching of this invention is applicable for use with walls of other materials such as other metals or other rigid structural support materials. In the preferred embodiment, the wall 13 is a flat steel plate. The rods 15 can be in the form of wire, bolts, studs or irregular diameter extensions which are attached to the plate at spaced portions on the plate and have an axial length greater than the thickness of the insulation to be attached to the plate. Although the term "rod" is used, it should be understood that conventional studs as known in the art, and as for example exemplified by pin insulation fasteners of the KSM and CD welding pin types sold by Omark Industries of Morristown, New Jersey, can be used. Such pins were previously used alone or to bind stainless steel netting to the surface of insulation but are used in a different manner in this invention as will be described. The pins are preferably welded to the steel plate, although in some cases, attachments can be made by screw threading, bolting and the like. Welding can be rapidly accomplished at low cost and is therefore preferred.

The thermal insulation may be any of the known high temperature resistant thermal insulation such as Fiberfrax, a trademarked product of Carborundum Corp. of Niagara Falls, New York, and MIN-K, a trademarked product of Union Carbide Corp. of New York, New York. Preferably the thermal insulation has a thermal conductivity in the range of 0.01 BTU/hr/ft$^2$/° F/ft to 0.2 BTU/hr/ft$^2$/° F/ft. It is preferably used in thicknesses of from 0.25 to 12.0 inch and in the form of sheet materials. The thickness and type of thermal insulation are designed to maintain the outer plate 13 at a safe cool value as for example ambient temperature. It should be understood that the insulation can be acoustic material where the stitching of this invention is used to attach suitable acoustic material to walls to dampen sound.

According to the method of this invention, a wall formed of steel plate 13 is preferably provided with a plurality of rods 15 welded at one end to the plate and lying in parallel rows from side to side and end to end of the plate as best seen in FIG. 4. The insulation is then positioned adjacent the plate with the rods passing through the insulation as again seen in FIG. 4.

The stitching is carried out by forming a preferably 90° rounded bend intermediate the ends of each rod 15 to place an intermediate portion 20 of the rod parallel to and tightly against the insulation pushing the insulation into and holding it in contact with the steel plate. A free end 21 of each rod is then bent or looped about the 90° bend portion 22 of an adjacent rod as best shown in FIG. 2 to form the stitch. Axially aligned rows such as rows 1, 2 and 3 in FIG. 4 are thus formed. Transverse wires 16 which can be substantially of the same materials, diameters and sizes as the rods 15 are then passed across the rows and interlocked with the loops as best illustrated in FIGS. 2 and 3 to form a square or rectangular grid positively pushing against and holding the insulation against the plate. In some cases, the transverse wires can be omitted.

FIG. 2 best illustrates the reaction to elevated temperatures of an insulated wall in accordance with this invention. The dotted outline position 30 shown in FIG. 2 indicates the position of the rod loop after exposure to elevated temperatures. Thus, the rod expands substantially along its axis at portion 20 and slides under an adjacent portion 20 of an adjacent rod without allowing bowing of the insulation from its plane. Any axial expansion of the rod portion 31 is minimized since that portion is insulated to some extent by passage through the thermal insulation. Moreover, the gentle 90° bend at bend 22 takes up some slight axial expansion that may extend between the surface of the insulation and the wall 13. Because of the stitching technique, the joint between the rods best illustrated at 33 acts to maintain the insulation in its original place while allowing expansion and contraction of the rod when subject to temperature variations which expand and contract the rods.

Similarly, expansion and contraction along the transverse wires occurs with these wires slipping easily within the loop portions and maintaining their axially aligned position. Ends of the transverse wires can be turned over and looped as shown in FIG. 3 at 40 if desired.

Preferably the grid formed is in rectangular configuration with portions 20 having lengths of from 2 inches on up to 2 feet or more depending upon the rigidity of the rods. It is preferred to use small diameter rods of stainless steel such as diameters of from 0.003 to 0.400 inch in order to minimize heat transfer through the rods to the outer wall 13. The rods do have sufficient rigidity to maintain the insulation in position.

In an alternate embodiment of this invention not shown, a coating may be applied over the rods such as a cement coating of Fiberfrax material. Thin ceramic coatings may also be applied over the rods and inner face of the insulation. Liquid resistant barriers of all kinds can be used as where liquids flow through conduits or are contained by insulation stitched in accordance with this invention.

In the preferred embodiment, the plate 13 is conventional steel plate of ⅛ inch thickness, rods 15 are 10 gauge stainless steel with a length of 10 inches, the insulation is MIN-K having a thickness of 2 inches and the transverse wires 16 are 10 gauge stainless steel. A grid on the face of the insulation is formed with the grid defining squares each having side walls of 8 inch length. Such a wall will withstand inner temperatures of well over a thousand degrees without allowing inward bowing of the insulation and maintaining the plate 13 substantially at ambient or a safe temperature. Thus when used in conduits such as conduit 10, such insulated walls maintain the cross sectional dimensions of the conduit 12 which can be important to prevent obstruction of flow characteristics through the conduits.

While specific embodiments of the present invention have been shown and described, many variations are possible. For example, while plane surfaces and planar sheets of insulation have been shown, the surfaces to be insulated can be curved or otherwise shaped. Plural insulation sheets can be held in place by the stitching of this invention.

What is claimed is:

1. An insulated material comprising a first wall having a surface with a layer of insulation thereover,
   said insulation being anchored to said wall by a plurality of rods each attached to said wall and extending through said insulation,
   said insulation being in sheet form and having a thermal conductivity in the range of from 0.01 BTU/hr/ft$^2$/° F/ft to 0.2 BTU/hr/ft$^2$/° F/ft.,
   said rods extend upwardly from said metal surface and being bent over to define a portion substantially coextensive with said wall sandwiching therebetween an insulating layer,
   a free end of each rod looped about and under a bent over portion of another rod so as to provide a sliding joint allowing expansion and contraction of each rod with respect to the joint while still maintaining said joint and binding said insulation to said plate, said rods are arranged in rows and adjacent rods are stitched to each other at said sliding joints, to form transverse rows, and transverse wire means interlocking with said sliding joints and mounted in slipping relationship therewith.

2. An insulated material in accordance with claim 1 wherein the bent over portions of said other rod are bent 90°.

3. An insulating material in accordance with claim 2 wherein said rods define a grid pattern over said metal surface.

4. An insulated material in accordance with claim 1 wherein said insulating material maintains said first wall at ambient temperature when said insulating material is exposed to a temperature within the range of 300° F to 2700° F.

5. A method of insulating a metal wall comprising, welding upstanding rods to said wall in a grid pattern, providing a sheet insulation over said wall with said rods passing through said sheet and said sheet having a thermal conductivity in the range of from 0.01 BTU/hr/ft$^2$/° F/ft to 0.2 BTU/hr/ft$^2$/° F/ft, bending over rods successively on a surface of said sheet and looping each successive end about an intermediate portion of an adjacent rod and under a bent over portion thereof to form a sliding joint at each loop when said rods are axially expanded or contracted.

6. A method in accordance with claim 5 wherein said rods are bent over and looped in successive side by side rows, and threading a transverse rod in slidable relation through loops of each row to form a grid over said surface of said sheet.

* * * * *